US010823208B2

(12) United States Patent
Slater

(10) Patent No.: US 10,823,208 B2
(45) Date of Patent: Nov. 3, 2020

(54) BAND CLAMP

(71) Applicant: Clamp-It LLC, Seattle, WA (US)

(72) Inventor: Thomas Arthur Slater, Greenville, SC (US)

(73) Assignee: CLAMP-IT LLC, Seattle, WA (US)

(*) Notice: Subject to any disclaimer, the term of this patent is extended or adjusted under 35 U.S.C. 154(b) by 302 days.

(21) Appl. No.: 15/728,325

(22) Filed: Oct. 9, 2017

(65) Prior Publication Data
US 2019/0107130 A1 Apr. 11, 2019

(51) Int. Cl.
F16L 33/08 (2006.01)
F16B 2/08 (2006.01)

(52) U.S. Cl.
CPC ................................... F16B 2/08 (2013.01)

(58) Field of Classification Search
CPC ........................................................ F16B 2/08
See application file for complete search history.

(56) References Cited

U.S. PATENT DOCUMENTS

| | | | | |
|---|---|---|---|---|
| 1,191,219 A * | 7/1916 | Pelter | ...................... | F16L 23/10 24/285 |
| 2,395,745 A * | 2/1946 | King | ...................... | F16L 21/005 285/367 |
| 3,604,074 A * | 9/1971 | Bambas | ...................... | F16L 33/08 24/274 R |
| 3,950,830 A * | 4/1976 | Duprez | ...................... | F16L 33/08 24/274 R |
| 4,099,304 A * | 7/1978 | Luc | ...................... | F16L 33/08 24/274 R |
| 4,308,648 A * | 1/1982 | Fay | ...................... | F16L 33/04 24/20 CW |
| 4,473,928 A * | 10/1984 | Johnson | ...................... | F16L 33/08 24/274 R |
| 5,115,541 A * | 5/1992 | Stichel | ...................... | F16L 33/02 24/20 R |
| 5,560,087 A * | 10/1996 | Marques | ...................... | F16L 33/08 24/19 |
| 5,787,555 A * | 8/1998 | Chen | ...................... | F16L 33/08 24/19 |
| 5,956,817 A * | 9/1999 | Chen | ...................... | F16L 33/08 24/274 R |
| 7,467,442 B2 * | 12/2008 | Chen | ...................... | F16L 33/08 24/274 R |
| D609,997 S * | 2/2010 | Andersson | ...................... | D23/265 |

(Continued)

Primary Examiner — Jason W San
(74) Attorney, Agent, or Firm — Davis Wright Tremaine LLP; George C. Rondeau, Jr.; Heather M. Colburn

(57) ABSTRACT

A lug used to construct a band clamp. The lug includes a rod receiving portion connected to a band receiving portion. The rod receiving portion has a distal portion opposite a proximal portion and a through-channel that allows a threaded rod to pass therethrough. The band receiving portion has head and tail portions and a passageway that allows the band to travel over the head and tail portions. The band receiving portion allows the band to be wrapped partway around the head portion after traveling over the head portion and thereafter to travel under both the head and tail portions. The proximal portion is closer to the passageway than the distal portion. The rod applies a tightening force directly to the band receiving portion and/or the proximal portion of the rod receiving portion. The rod does not apply the tightening force directly to the distal portion.

14 Claims, 12 Drawing Sheets

(56) References Cited

U.S. PATENT DOCUMENTS

| | | | |
|---|---|---|---|
| 8,607,420 B2* | 12/2013 | De Campos | F16L 33/08 24/19 |
| 8,677,571 B2* | 3/2014 | Bowater | F16L 33/08 24/20 R |
| 8,832,906 B2* | 9/2014 | Buytaert | B25B 27/10 24/20 R |
| 9,534,717 B2* | 1/2017 | Wyatt | F16L 33/08 |
| 10,458,580 B2* | 10/2019 | Henrich | F16L 33/08 |
| 2012/0005866 A1* | 1/2012 | Ireland | E03O 1/12 24/278 |
| 2013/0074290 A1* | 3/2013 | Wyatt | F16L 33/08 24/274 R |
| 2016/0083158 A1* | 3/2016 | Wyatt | F16L 33/08 24/274 R |

* cited by examiner

BAND CLAMP

BACKGROUND OF THE INVENTION

Field of the Invention

The present invention is directed generally to band clamps.

Description of the Related Art

A band clamp is used to clamp ends of a band together about one or more other objects. For example, one or more bands each secured by a different band clamp may be used to clamp staves of a hot tub together. There is a need for new and/or improved band clamp designs. The present application provides these and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
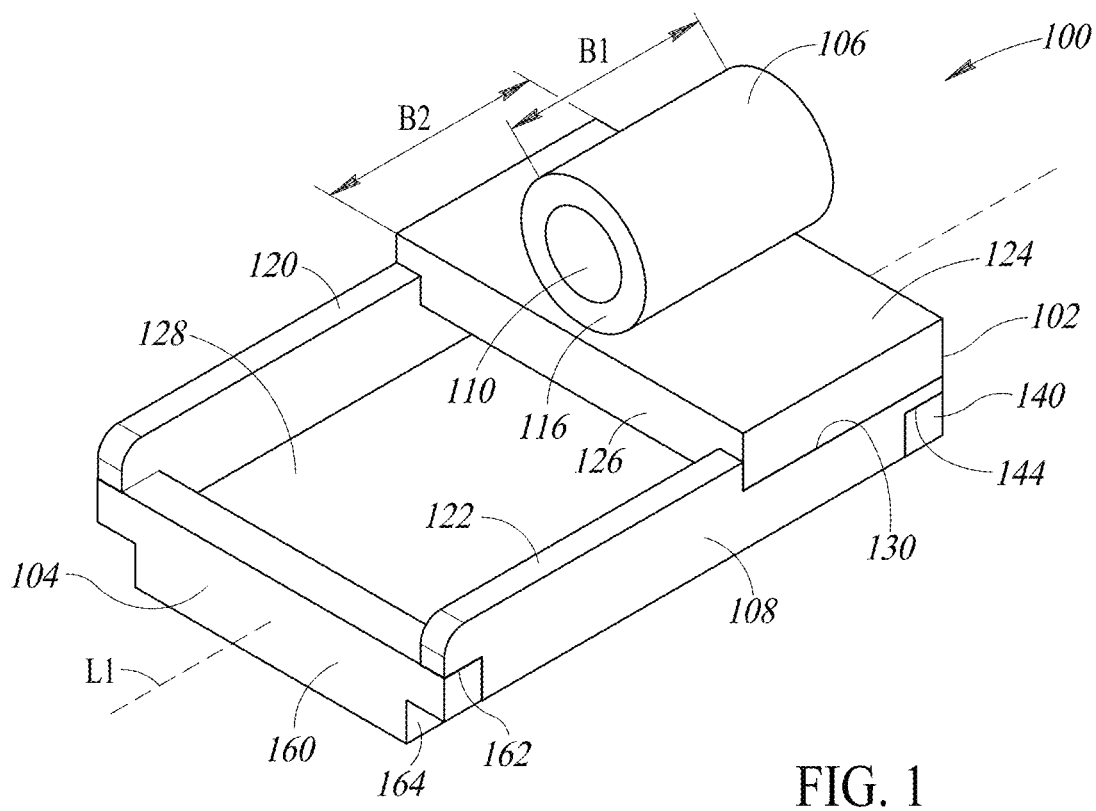
FIG. 1 is a top perspective view of a back portion of a first embodiment of a lug of a band clamp.

FIG. 1 is a perspective view of a first embodiment of a lug 100 having a front portion 102 opposite a back portion 104. A longitudinal dimension "L1" extends between the front and back portions 102 and 104. The lug 100 includes a rod receiving portion or barrel 106 connected to a band receiving portion or a base portion 108.

Figure 2:
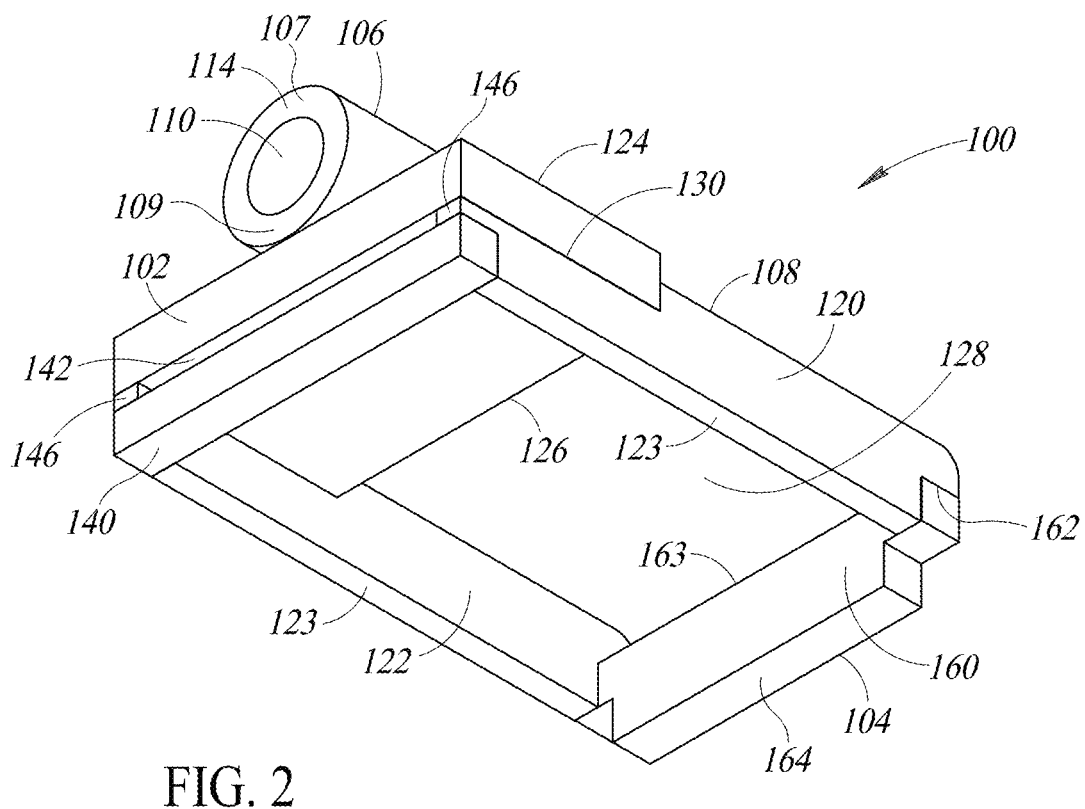
FIG. 2 is a bottom perspective view of a front portion of the lug of FIG. 1.

The barrel 106 is positioned at or near the front portion 102 of the lug 100. Referring to FIG. 2, the barrel 106 has a distal portion 107 opposite a proximal portion 109. The proximal portion 109 is closer to the base portion 108 than the distal portion 107.

Referring to FIG. 1, the barrel 106 has a front facing surface 114 (see FIG. 2) opposite a back facing surface 116. Referring to FIG. 2, in the embodiment illustrated, the front facing surface 114 is positioned at the front portion 102 and the back facing surface 116 (see FIGS. 1, 3, and 5) is spaced apart from the back portion 104. Thus, the barrel 106 is closer to the front portion 102 than the back portion 104.

Figure 4:
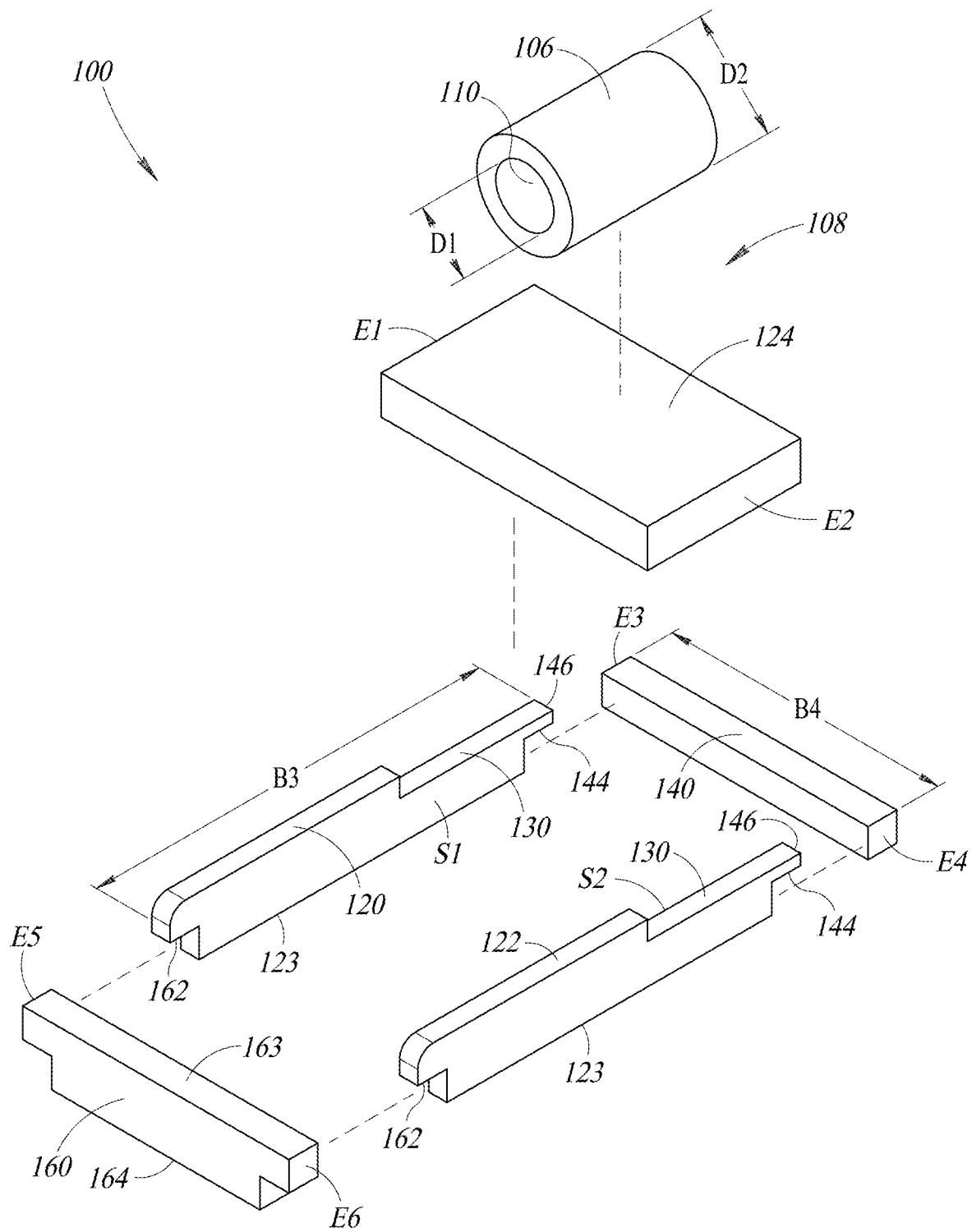
FIG. 4 is an exploded perspective view of the lug of FIG. 1.
Figure 5:
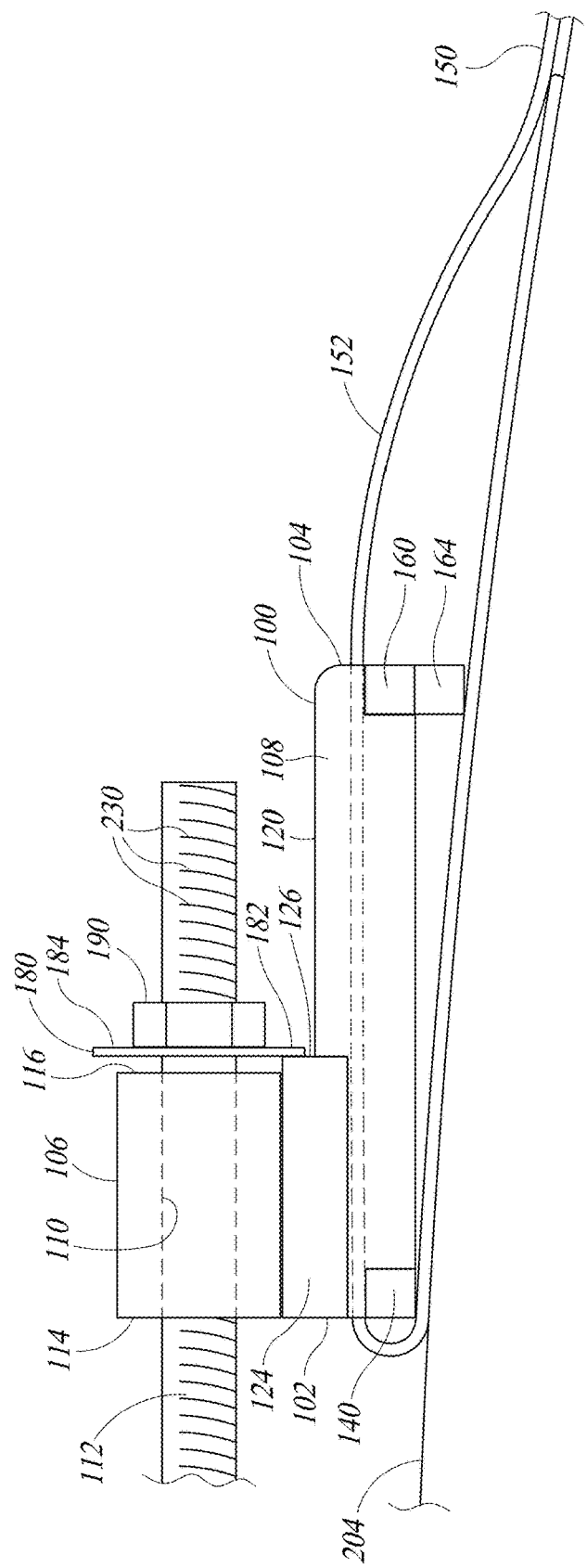
FIG. 5 is a side elevational view of the lug of FIG. 1 attached to a threaded rod and a band that is wrapped around one or more objects.

Referring to FIG. 1, the barrel 106 has an open-ended through-channel 110 that extends along the longitudinal dimension "L1." Referring to FIG. 4, in the embodiment illustrated, the through-channel 110 has a generally circular cross-sectional shape with an inner diameter "D1" (e.g., about 0.44 inches). As shown in FIG. 5, the through-channel 110 is configured to allow a threaded rod 112 with outside threads 230 to pass therethrough. Referring to FIG. 4, in the embodiment illustrated, the barrel 106 is substantially cylindrically shaped with an outer diameter "D2" (e.g., about 0.69 inches). However, this is not a requirement.

Referring to FIG. 1, the barrel 106 may have a length "B1" along the longitudinal dimension "L1." By way of a non-limiting example, the length "B1" may be about 0.94 inches. By way of another non-limiting example, the length "B1" of the barrel 106 may greater than about 0.5 inches.

The base portion 108 includes first and second side rails 120 and 122 that extend along the longitudinal dimension "L1" and have a length "B3" (see FIG. 4) along the longitudinal dimension "L1." Referring to FIG. 4, by way of a non-limiting example, the length "B3" may be about 2.5 inches. The first and second side rails 120 and 122 may be substantially identical to one another and each have a lower edge 123. In the embodiment illustrated, the lower edges 123 of the first and second side rails 120 and 122 are each substantially planar. However, in alternate embodiments, the lower edges 123 may be curved (e.g., to correspond to an outer surface of one or more objects 204, illustrated in FIGS. 5, 7, 8, 15, and 16, against which the lower edges 123 of the lug 100 may be positioned).

Referring to FIG. 1, the first and second side rails 120 and 122 support a transverse platform 124 positioned at or near the front portion 102 of the lug 100. The barrel 106 is positioned upon and attached to the platform 124. The platform 124 may be substantially planer and have a generally rectangular shape. The platform 124 extends from the front portion 102 only partway toward the back portion 104. Thus, the platform 124 has a backward facing edge 126 spaced apart from the back portion 104. An open portion 128 is defined between the first and second side rails 120 and 122, the backward facing edge 126, and the back portion 104.

In the embodiment illustrated, the platform 124 is positioned on top of the first and second side rails 120 and 122. Referring to FIG. 4, also in the embodiment illustrated, the first and second side rails 120 and 122 each have a first cutout portion 130 formed along their upper edges. The platform 124 is positioned within and attached to the first cutout portions 130 of the first and second side rails 120 and 122. In alternate embodiments, the platform 124 may be configured to be positioned in between the first and second side rails 120 and 122 and the first cutout portions 130 may be omitted from the first and second side rails 120 and 122. In such embodiments, the platform 124 may be attached along its side edges "E1" and "E2" to inwardly facing surfaces "S1" and "S2," respectively, of the first and second side rails 120 and 122, respectively.

Referring to FIG. 2, in the front portion 102 and under the platform 124, the first and second side rails 120 and 122 are connected together by a transverse front or head cross member 140. The first and second side rails 120 and 122 each have an end portion 146 at the front portion 102. The head cross member 140 is spaced apart from the platform 124 by the end portions 146 of the first and second side rails 120 and 122. Thus, a gap 142 is defined between the platform 124 and the head cross member 140.

Referring to FIG. 4, the head cross member 140 may be substantially rectangular in shape and have a length "B4" oriented transverse to the longitudinal dimension "L1" (see FIG. 1). By way of a non-limiting example, the length "B4" may be about 1.74 inches. The head cross member 140 may have a substantially square cross-sectional shape along the longitudinal dimension "L1" (see FIG. 1). Thus, the height and width of the head cross member 140 may be substantially equal (e.g., each about 0.19 inches). In alternate embodiments, the head cross member 140 may have a substantially rectangular cross-sectional shape that is longer along the longitudinal dimension "L1" (see FIG. 1). By way of a non-limiting example, the height of the head cross member 140 may be about 0.19 inches and the width of the head cross member 140 may be about 1.0 inch.

Referring to FIG. 4, in the embodiment illustrated, the first and second side rails 120 and 122 each have a second cutout portion 144 formed along their lower edges at their end portions 146. The head cross member 140 is positioned within and attached to the second cutout portions 144 of the first and second side rails 120 and 122. In alternate embodiments, the second cutout portions 144 may be omitted from the first and second side rails 120 and 122 and the head cross member 140 may be configured to be positioned in between the first and second side rails 120 and 122. In such embodiments, the head cross member 140 may be attached along its side edges "E3" and "E4" to the inwardly facing surfaces "S1" and "S2," respectively, of the first and second side rails 120 and 122, respectively, at the front portion 102 (see FIGS. 1-3 and 5) of the lug 100.

Referring to FIG. 2, in the back portion 104, the first and second side rails 120 and 122 are connected together by a transverse back or tail cross member 160. In the embodiment illustrated, the tail cross member 160 has a substantially T-shaped outer shape with an upper portion 163 positioned above a lower portion 164. In alternate embodiments, the tail cross member 160 may have a substantially rectangular outer shape. Referring to FIG. 4, in the embodiment illustrated, the first and second side rails 120 and 122 each have a third cutout portion 162 formed along their lower edges at the back portion 104 (see FIGS. 1-3 and 5) of the lug 100. The upper portion 163 of the tail cross member 160 is positioned within and attached to the third cutout portions 162 of the first and second side rails 120 and 122. In alternate embodiments, the third cutout portions 162 may be omitted from the first and second side rails 120 and 122 and the tail cross member 160 may have a substantially rectangular outer shape configured to be positioned in between the first and second side rails 120 and 122. In such embodiments, the tail cross member 160 may be attached along its side edges "E5" and "E6" to the inwardly facing surfaces "S1" and "S2," respectively, of the first and second side rails 120 and 122, respectively, at the back portion 104 (see FIGS. 1-3 and 5) of the lug 100.

Referring to FIG. 5, the gap 142 (see FIG. 2) is configured to allow a band 150 to pass therethrough. Thus, the lug 100 has a passageway that includes the gap 142 and allows the band 150 to travel over both the head and tail cross members 140 and 160. The band 150 wraps partway around the head cross member 140 after traveling over the head cross member 140. Then, the band 150 travels under both the head and tail cross members 140 and 160 along the outer surface of the object(s) 204. Thus, as shown in FIG. 5, the head and tail cross members 140 and 160 both rest upon the band 150. As shown in FIG. 2, the proximal portion 109 of the barrel 106 is closer to the passageway than the distal portion 107 of the barrel 106.

Referring to FIG. 2, the lower portion 164 of the tail cross member 160 extends outwardly beyond the first and second side rails 120 and 122 (e.g., about 0.19 inches). Thus, referring to FIG. 3, when the base portion 108 of the lug 100 is positioned on a flat surface 170, the lower portion 164 of the tail cross member 160 will position the first and second side rails 120 and 122 (see FIGS. 1, 2, and 4) to extend at an angle "A1" with respect to the flat surface 170. By way of a non-limiting example, the angle "A1" may range from about 3 degrees to about 6 degrees. For example, the angle "A1" may be a little greater than 4 degrees (e.g., about 4.29 degrees, about 4.35 degrees, and the like). By way of another non-limiting example, the angle "A1" may be within a range from 4 degrees to 5 degrees. By way of yet another non-limiting example, the angle "A1" (see FIG. 3) may range from 3 degrees to 9 degrees. Referring to FIG. 5, the angle "A1" (see FIG. 3) may vary depending upon a diameter of the object(s) 204 being secured by the band 150. For example, if the lug 100 is used to secure the band 150 around a pole (not shown) with a diameter of about 12 inches, the angle "A1" (see FIG. 3) may be as great as 9 degrees. In such an application, the lug 100 may be smaller and the length "B3" (see FIG. 4) shorter. The angle "A1" (see FIG. 3) may help maintain the lug 100 in a substantially tangential orientation when the lug 100 is positioned against the object(s) 204 and the object(s) 204 (e.g., a round traffic pole or standard) have a round cross-sectional shape with a rounded outer surface. Referring to FIG. 5, the angle "A1" (see FIG. 3) may also help offset any forward tipping of the lug 100 and help maintain pressure on the object(s) 204 (see FIGS. 5, 7, 8, 15, and 16) under the lug 100. This may help in applications in which a portion 152 of the band 150 connected to the lug 100 or positioned near the lug 100 does not physically contact the object(s) 204. The portion of the band 150 may be positioned above (or be raised away from) the object(s) 204 in part by the tail cross member 160.

Figure 3:
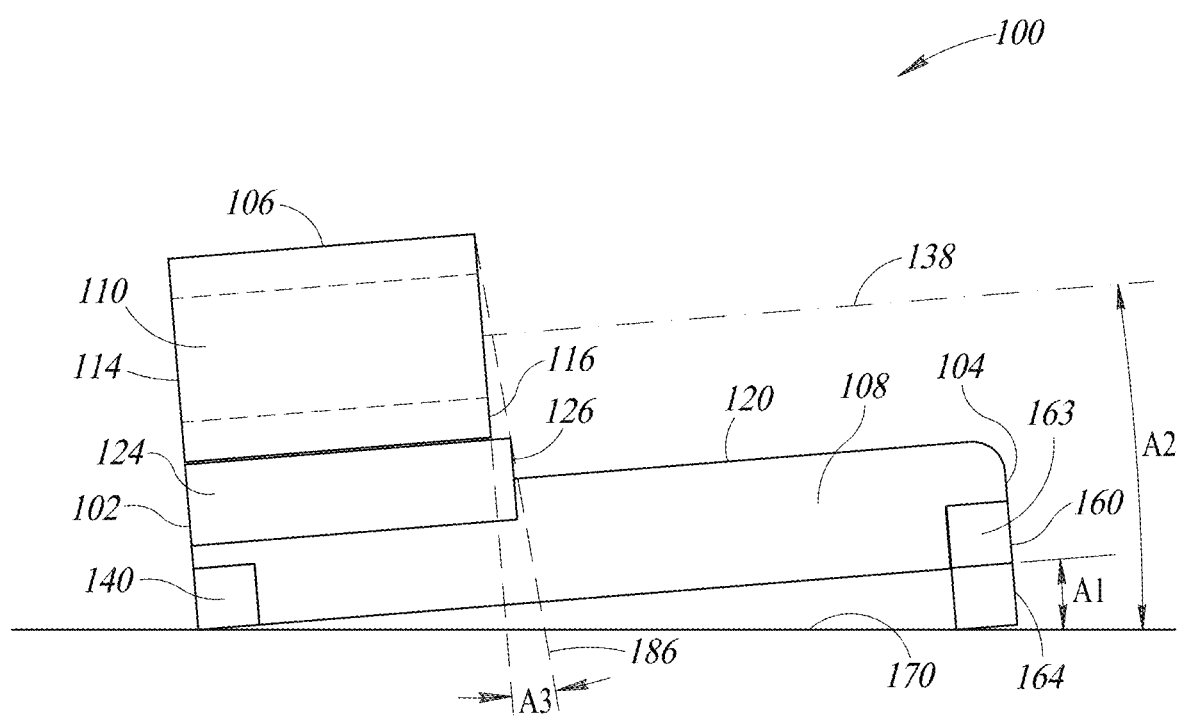
FIG. 3 is a side elevational view of the lug of FIG. 1 placed on a flat surface.

Referring to FIG. 3, the lower portion 164 of the tail cross member 160 positions the through-channel 110 of the barrel 106 to extend along an angle "A2" with respect to the flat surface 170. In FIG. 3, the through-channel 110 extends along a central axis represented by a dashed line 138. Thus, the dashed line 138 extends along the angle "A2" with respect to the flat surface 170. In the embodiment illustrated, the angles "A1" and "A2" are substantially identical. Thus, in this orientation, the through-channel 110 of the barrel 106 may slant downwardly toward the front portion 102 of the lug 100. The angle "A2" may help maintain the through-channel 110 in a substantially flat orientation when the lug 100 is positioned against a rounded outer surface of the object(s) 204 (see FIGS. 5, 7, 8, 15, and 16).

As shown in FIG. 1, the length "B1" of the barrel 106 may be shorter (e.g., by about 0.06 inches) than a length "B2" of the platform 124 along the longitudinal dimension "L1." Referring to FIG. 3, an angle "A3" (e.g., a little greater than 4 degrees) may be defined between the back facing surface 116 of the barrel 106 and a dashed line 186 that extends from the top of the back facing surface 116 of the barrel 106 and the top of the backward facing edge 126 of the platform 124. By way of a non-limiting example, the angle "A3" may range from about 3 degrees to about 6 degrees. For example, the angle "A3" may be a little greater than 4 degrees (e.g., about 4.29 degrees, about 4.35 degrees, and the like). By way of another non-limiting example, the angle "A3" may be within a range from 4 degrees to 5 degrees. By way of yet another non-limiting example, the angle "A3" may range from 3 degrees to 9 degrees.

Referring to FIG. 5, the threaded rod 112 is operable to apply a vector tightening force to the lug 100. As will be explained below, a washer 180 may be placed alongside the back facing surface 116 of the barrel 106. However, a lower portion 182 of the washer 180 will abut the backward facing edge 126 of the platform 124 and an upper portion 184 of the washer 180 will be spaced apart from the back facing surface 116 of the barrel 106. A nut 190 with inside threads 192 (see FIG. 15) configured to mate with the outside threads 230 of the threaded rod 112 is threaded onto the threaded rod 112. The nut 190 is tightened against and applies the vector tightening force to the washer 180. The washer 180 directly applies the vector tightening force to the backward facing edge 126 of the platform 124 (or the lowest point possible), which pushes the front portion 102 of the lug 100 forwardly and outwardly away from the object(s) 204. This arrangement reduces the tendency of the front portion 102 of the lug 100 to tip toward the object(s) 204, which can bend the threaded rod 112 and/or cause the threaded rod 112 to bind as it moves. In other words, because the vector tightening force is directed at the backward facing edge 126 of the platform 124 (beneath the barrel 106) and not to the barrel 106, the tipping aspect of the vector tightening force (created by tightening the nut 190) is reduced.

In alternate embodiments, the lower portion 182 of the washer 180 may abut both the backward facing edge 126 of the platform 124 and the back facing surface 116 along the proximal portion 109 (see FIG. 2). However, in such embodiments, the upper portion 184 of the washer 180 is spaced apart from the back facing surface 116 along the distal portion 107 (see FIG. 2).

Referring to FIG. 2, together the first side rail 120, the second side rail 122, the head cross member 140, and the tail cross member 160 define a generally rectangular outer shape having the length "B3" (see FIG. 4) and a width equal to the length "B4" (see FIG. 4). The length "B1" of the barrel 106 relative to the length "B3" (see FIG. 4) of the lug 100 and the position of the barrel 106 relative to the base portion 108 decreases the vector tightening force applied to the front portion 102 of the lug 100 by the threaded rod 112 (see FIGS. 5, 7, 8, 15, and 16), making the lug 100 less likely to tip forward when the threaded nut 190 (see FIG. 5) is tightened against the washer 180 (see FIG. 5) on the threaded rod 112.

Referring to FIG. 5, the band 150 passes over the tail cross member 160 and exerts pressure on the back portion 104 of the lug 100 when the nut 190 is tightened against the washer 180. That pressure either prevents the back portion 104 of the lug 100 from rising, which tilts the lug 100 forwardly toward the object(s) 204, or reduces an amount by which the back portion 104 of the lug 100 will rise and tilt the lug 100 forwardly toward the object(s) 204. The greater the length "B3" (see FIG. 4) of the lug 100, the greater the lever force of the band 150 pressing down on the tail cross member 160, which reduces tilting. Therefore, the length "B3" (see FIG. 4) and/or the position of the tail cross member 160 may be determined at least in part based on whether the lug 100 tilts toward the object(s) 204.

Further, increasing a distance between the front portion 102 and the back facing surface 116 of the barrel 106 decreases the vector tightening force applied to the front portion 102 by the threaded rod 112, which makes it less likely that the lug 100 will tip forwardly (causing the back portion 104 to lift in the direction of the threaded rod 112) when the threaded rod 112 is tightened. Referring to FIG. 1, in the lug 100, the distance between the front portion 102 and the back facing surface 116 is equal to the length "B1." Thus, by increasing the length "B1," it may be possible to reduce the likelihood that the lug 100 will tip forwardly. Therefore, the length "B1" (see FIG. 1) may be determined at least in part based on whether the lug 100 tilts toward the object(s) 204.

Referring to FIG. 4, the lug 100 may be constructed from stainless steel (e.g., 316 stainless steel) aluminum, and the like. The barrel 106, the platform 124, the first side rail 120, the second side rail 122, the head cross member 140, and the tail cross member 160 may be coupled together to form the lug 100 using any suitable method, including welding. Thus, the lug 100 may be constructed using fabrication techniques.

Figure 6:
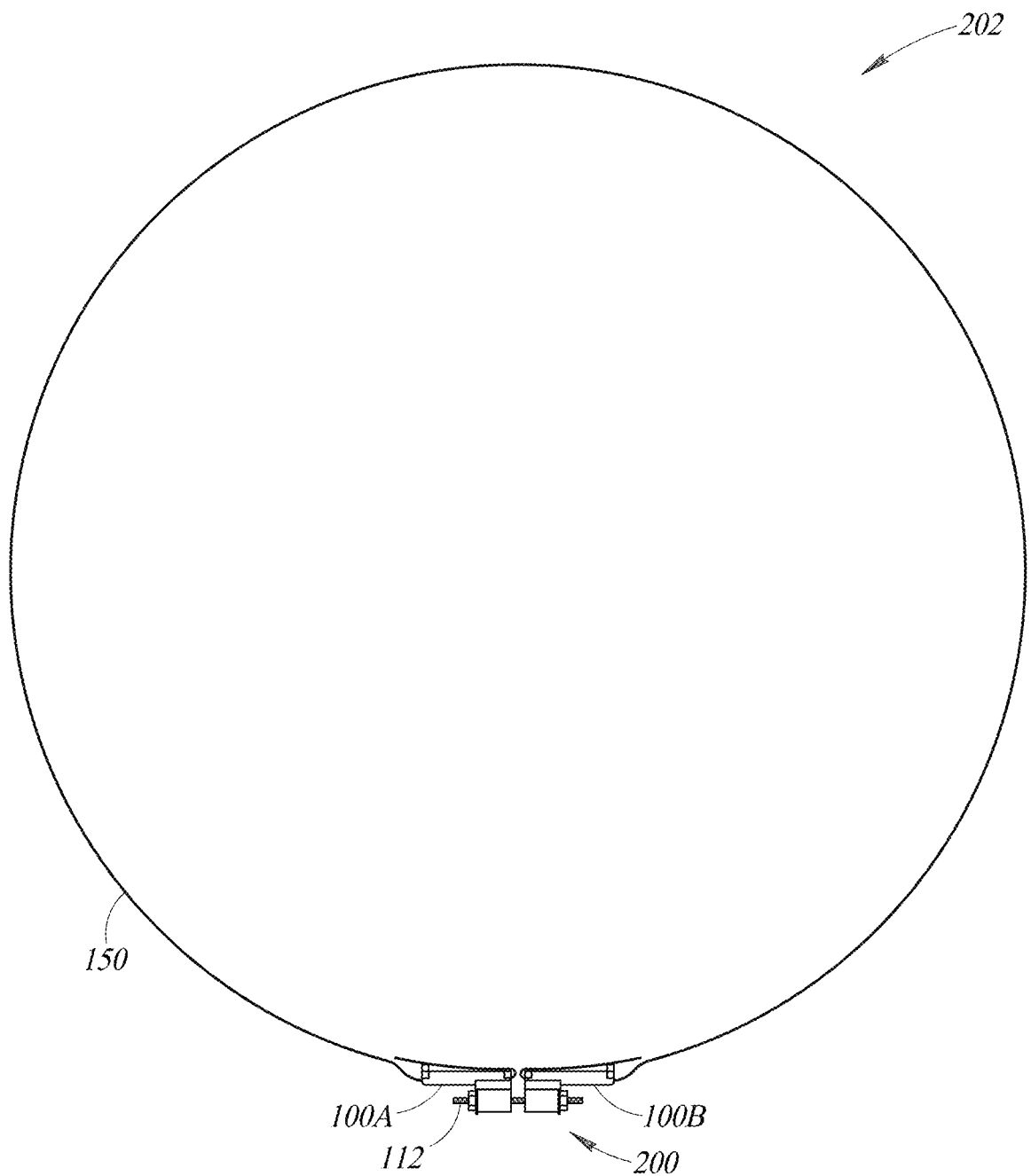
FIG. 6 is a side elevational view of a band clamp that includes a pair of lugs each like the lug of FIG. 1, the threaded rod, a pair of washers, and a pair of nuts.

FIG. 6 illustrates an embodiment of a band clamp 200 clamping the band 150 into a closed shape 202 (e.g., a ring). For example, referring to FIG. 8, the closed shape 202 (see FIG. 6) may be used to clamp staves 260 of a hot tub together. In such embodiments, the band 150 maintains even pressure on each of the staves 260.

Figure 7:
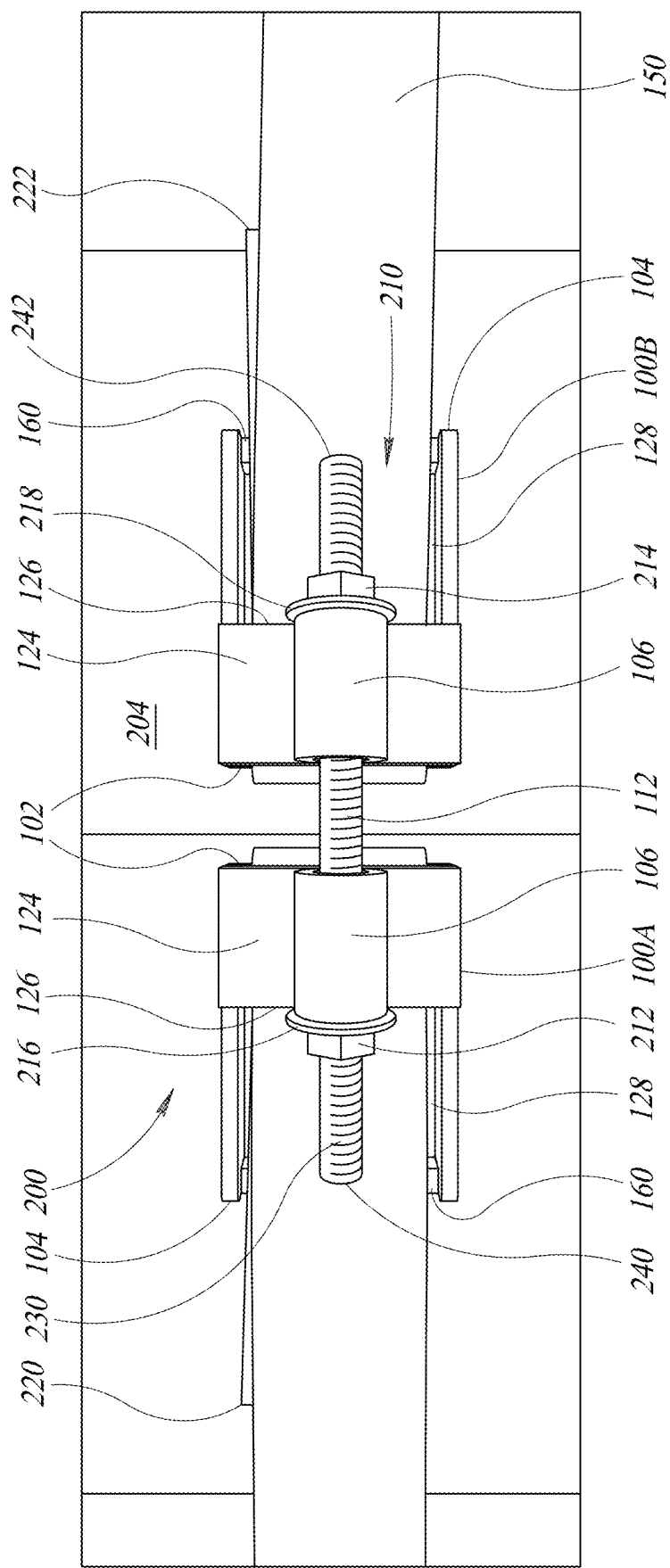
FIG. 7 is a top perspective view of the band clamp of FIG. 6.
Figure 8:
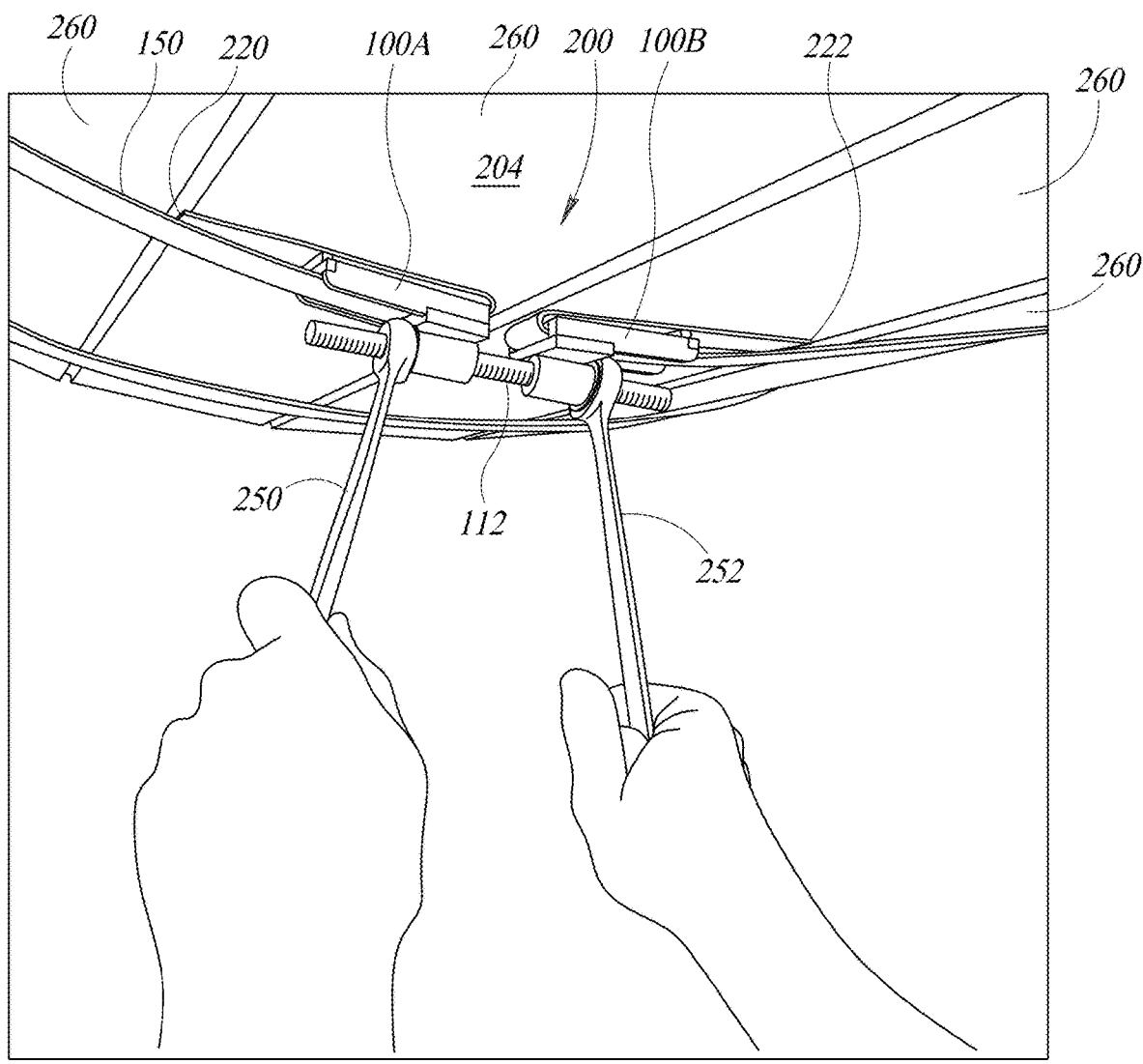
FIG. 8 is a side perspective view of the band clamp of FIG. 6 illustrated with wrenches being used to tighten the nuts.
Figure 16:
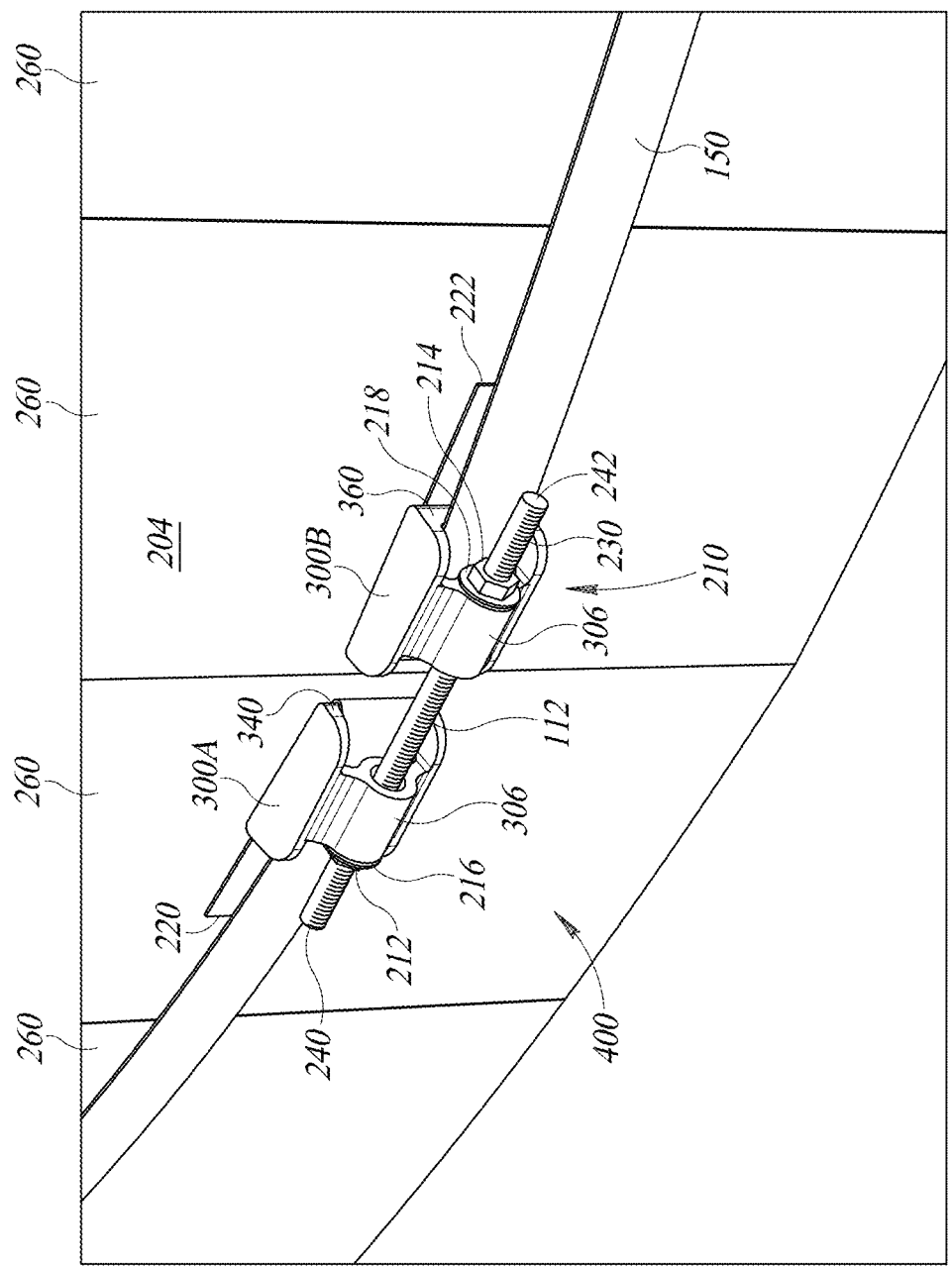
FIG. 16 is a side elevational view of a band clamp that includes a pair of lugs each like the lug of FIG. 9, the threaded rod, the pair of washers, and the pair of nuts.

FIG. 7 illustrates the band clamp 200 clamping the band 150 around the object(s) 204 (e.g., the staves 260 illustrated in FIGS. 8 and 16). The band clamp 200 includes a first lug 100A, a second lug 100B, the threaded rod 112, and one or more fasteners 210. The first and second lugs 100A and 100B are each substantially identical to the lug 100 (see FIGS. 1-5). Therefore, in the drawings, like reference numerals have been used to identify like components of the lugs 100, 100A, and 100B.

In the embodiment illustrated, the fasteners 210 have been implemented as nuts 212 and 214 and washers 216 and 218. The nuts 212 and 214 are each substantially identical to the nut 190 (see FIG. 5) and the washers 216 and 218 are each substantially identical to the washer 180 (see FIG. 5).

The band 150 has a first end 220 opposite a second end 222. By way of a non-limiting example, the band 150 may have a width of about 0.75 inches to about 1.25 inches. The band 150 is formed into the closed shape 202 (see FIG. 6) by connecting the first and second ends 220 and 222 to the first and second lugs 100A and 1006, respectively. Then, the first and second lugs 100A and 1006 are coupled together by the threaded rod 112 and the fasteners 210.

The first end 220 of the band 150 is connected to the first lug 100A by passing the first end 220 over the tail cross member 160 of the first lug 100A, passing the first end 220 through the open portion 128, passing the first end 220 under the platform 124, and inserting the first end 220 through the gap 142 (see FIG. 2) of the first lug 100A. Then, the first end 220 is bent around the head cross member 140 (see FIGS. 1-5) of the first lug 100A and directed backwardly under the tail cross member 160 of the first lug 100A. As shown in FIG. 7, the first end 220 may be positioned behind the first lug 100A. Similarly, the second end 222 of the band 150 is connected to the second lug 1006 by passing the second end 222 over the tail cross member 160 of the second lug 1006, passing the second end 222 through the open portion 128, passing the first end 220 under the platform 124, and inserting the second end 222 through the gap 142 (see FIG. 2) of the second lug 1006. Then, the second end 222 is bent around the head cross member 140 (see FIGS. 1-5) of the second lug 100B and directed backwardly under the tail cross member 160. As shown in FIG. 7, the second end 222 may be positioned behind the second lug 1006. Thus, the first and second lugs 100A and 1006 do not have to be welded to the band 150 to form the closed shape 202 (see FIG. 6).

As mentioned above, the first and second lugs 100A and 1006 are coupled together by the threaded rod 112 and the fasteners 210. The first and second lugs 100A and 1006 are positioned so that their front portions 102 are aligned with one another and the threaded rod 112 is inserted into the barrels 106 of the first and second lugs 100A and 1006. The threaded rod 112 has a first end 240 opposite a second end 242. The first end 240 extends outwardly from the barrel 106 of the first lug 100A and the second end 242 extends outwardly from the barrel 106 of the second lug 1006.

The fasteners 210 couple the first end 240 to the first lug 100A. First, the washer 216 is positioned on the first end 240 of the threaded rod 112. The washer 216 is slid along the threaded rod 112 until the washer 216 abuts the backward facing edge 126 of the platform 124 of the first lug 100A. In the embodiment illustrated, the outside threads 230 of the threaded rod 112 are configured to mate with inside threads (substantially identical to the inside threads 192 illustrated in FIG. 15) of the nut 212. Next, the nut 212 is positioned on the first end 240 of the threaded rod 112 and threaded along the threaded rod 112 until the nut 212 is positioned alongside the washer 216. Finally, referring to FIG. 8, the nut 212 (see FIGS. 7 and 16) is tightened as desired (e.g., using a wrench 250).

Likewise, referring to FIG. 7, the fasteners 210 couple the second end 242 to the second lug 1006. First, the washer 218 is positioned on the second end 242 of the threaded rod 112. The washer 218 is slid along the threaded rod 112 until the washer 218 abuts the backward facing edge 126 of the platform 124 of the second lug 1006. In the embodiment illustrated, the outside threads 230 of the threaded rod 112 are configured to mate with inside threads (substantially identical to the inside threads 192 illustrated in FIG. 15) of the nut 214. Next, the nut 214 is positioned on the second end 242 and threaded along the threaded rod 112 until the nut 214 is positioned alongside the washer 218. Finally, referring to FIG. 8, the nut 214 (see FIGS. 7 and 16) is tightened as desired (e.g., using a wrench 252).

Referring to FIG. 7, tightening one or both of the nuts 212 and 214 decreases the distance between the first and second lugs 100A and 1006 and decreases the area of the closed shape 202 (see FIG. 6). Loosening one or both of the nuts 212 and 214 increases the distance between the first and second lugs 100A and 1006 and increases the area of the closed shape 202 (see FIG. 6). Thus, tightening one or both of the nuts 212 and 214 increases tension in the band 150 when the band 150 is used to clamp the object(s) 204. On the other hand, loosening one or both of the nuts 212 and 214 decreases the tension in the band 150 when the band 150 is used to clamp the object(s) 204.

As mentioned above, the washer 216 abuts the backward facing edge 126 of the platform 124 of the first lug 100A. Similarly, the washer 218 abuts the backward facing edge 126 of the platform 124 of the second lugs 100B. Thus, the forwardly directed vector tightening forces applied to the first and second lugs 100A and 100B by the tightening the nuts 212 and 214, respectively, pushes the front portions 102 of the first and second lugs 100A and 100B forwardly but not toward the object(s) 204. This reduces the tendency of the first and second lugs 100A and 100B to tip, which causes their back portions 104 (see FIGS. 1-5) to lift away from the object(s) 204 and can bend the threaded rod 112 and/or bind the threaded rod 112 as the threaded rod 112 moves. In other words, the higher up on the rear facing surfaces 116 of the barrels 106 that the vector tightening forces are applied, the more the first and second lugs 100A and 100B will tilt toward the object(s) 204. Because the vector tightening forces are applied to the lowest point possible along the backward facing edges 126 of the first and second lugs 100A and 100B, the first and second lugs 100A and 100B avoid tilting. Further, tightening and drawing the first and second lugs 100A and 100B forwardly (while avoiding tilting) brings the bottom surfaces of the lugs 100A and 100B and the band 150 into tighter and tighter contact with the object(s) 204, which clamps the object(s) 204 firmly.

As mentioned above, the band clamp 200 is configured to help prevent the threaded rod 112 from bending when one or both of the nuts 212 and 214 are tightened. This is achieved because, as explained above, the first and second lugs 100A and 100B are each configured to avoid tipping or tilting forwardly when one or both of the nuts 212 and 214 are tightened, which can cause the threaded rod 112 to bend. This allows the first and second lugs 100A and 100B to move smoothly when one or both of the nuts 212 and 214 are tightened without the first and second lugs 100A and 100B tipping or the threaded rod 112 binding.

Referring to FIG. 5, the lower portion 164 of the tail cross member 160 is configured to maintain tight contact with the band 150 between the tail cross member 160 and the object(s) 204. This maintains pressure on any material (e.g., the object(s) 204) positioned inside and clamped by the closed shape 202 (see FIG. 6) defined by the band 150. For example, referring to FIG. 8, the object(s) 204 may be the staves 260 of a hot tub and the closed shape 202 (see FIG. 6) may be used to clamp the staves 260 together to form the hot tub. The band 150 may be used to maintain even pressure on each of the staves 260.

Referring to FIG. 7, the outside threads 230 of the threaded rod 112 have been illustrated as extending the full length of the threaded rod 112 from the first end 240 to the second end 242. However, in alternate embodiments, the threaded rod 112 may be implemented as a carriage bolt (e.g., a galvanized carriage bolt) having a bolt head at one of the first and second ends 240 and 242. Immediately adjacent to the bolt head, the carriage bolt has a bolt section with a generally square cross-sectional shape that functions as a key. In such embodiments, one of the nuts 212 and 214 and one of the washers 216 and 218 may each be omitted. Further, the through-channel 110 (see FIGS. 1-5) of one or both of the first and second lugs 100A and 1106 may have a square cross-sectional shape that extends from the back facing surface 116 (see FIGS. 1, 3, and 5) toward the front facing surface 114 (see FIGS. 2, 3, and 5) and functions as a keyway. The keyway is configured to receive and prevent the rotation of the key of the carriage bolt with respect to the barrel 106.

Some or all of the components of the band clamp 200 may be packaged into a first kit. For example, the first kit may include the first and second lugs 100A and 1006. Optionally, the first kit may also include the threaded rod 112, the band 150, and/or the fasteners 210 (e.g., the nuts 212 and 214 and the washers 216 and 218).

Figure 9:
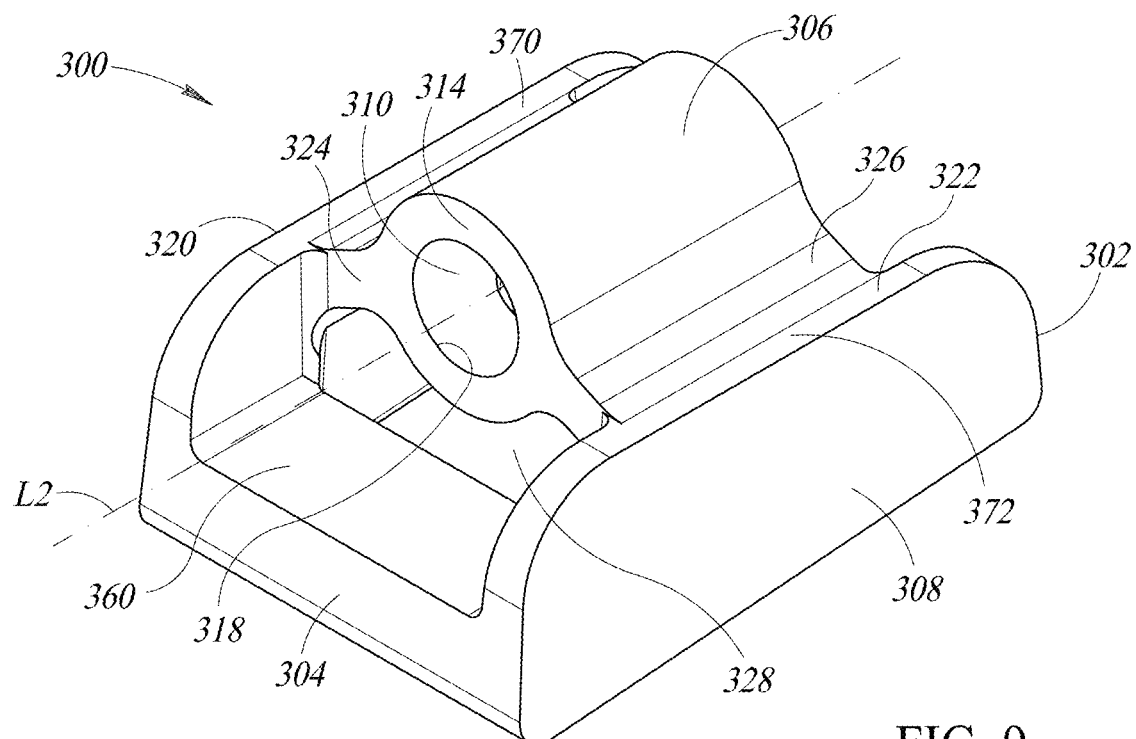
FIG. 9 is a top perspective view of a back portion of a second embodiment of a lug.

FIG. 9 is a perspective view of a second embodiment of a lug 300 having a front portion 302 opposite a back portion 304. The lug 300 may be cast instead of fabricated. For example, the lug 300 may be cast from stainless steel (e.g., 316 stainless steel), aluminum, and the like. A longitudinal dimension "L2" extends the front and back portions 302 and 304. The lug 300 includes a rod receiving portion or barrel 306 and a band receiving portion or a base portion 308.

The barrel 306 is positioned between the front and back portions 302 and 304 of the lug 300 with the barrel 306 being positioned closer to the front portion 302 than the back portion 304. The barrel 306 has a front facing surface 312 (see FIGS. 10 and 12-15) opposite a back facing surface 314. By way of a non-limiting example, the front facing surface 312 (see FIGS. 10 and 12-15) may be spaced apart from the front portion 302 by about 0.5 inches and the back facing surface 314 may be spaced apart from the back portion 304 by about 0.61 inches. In alternate embodiments, the barrel 306 may be positioned midway between the front and back portions 302 and 304.

Figure 14:
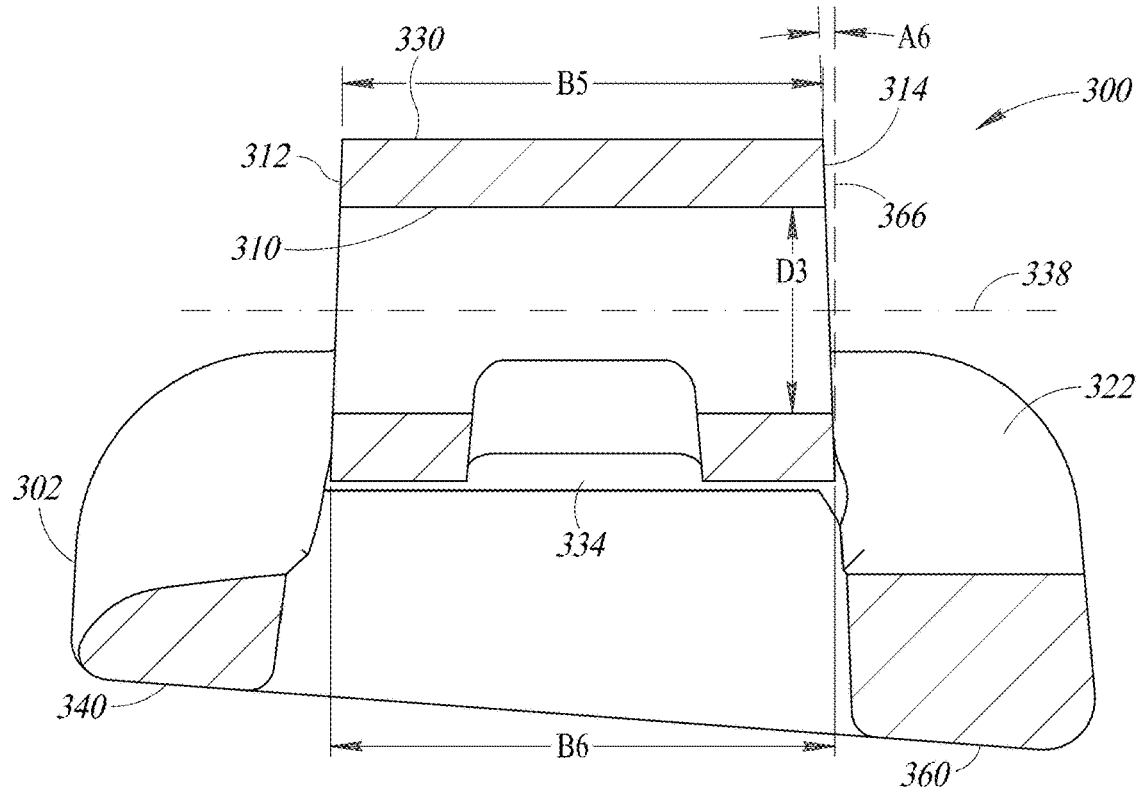
FIG. 14 is a cross-sectional view of the lug of FIG. 9 taken through a line 14-14 illustrated in FIG. 13.
Figure 15:
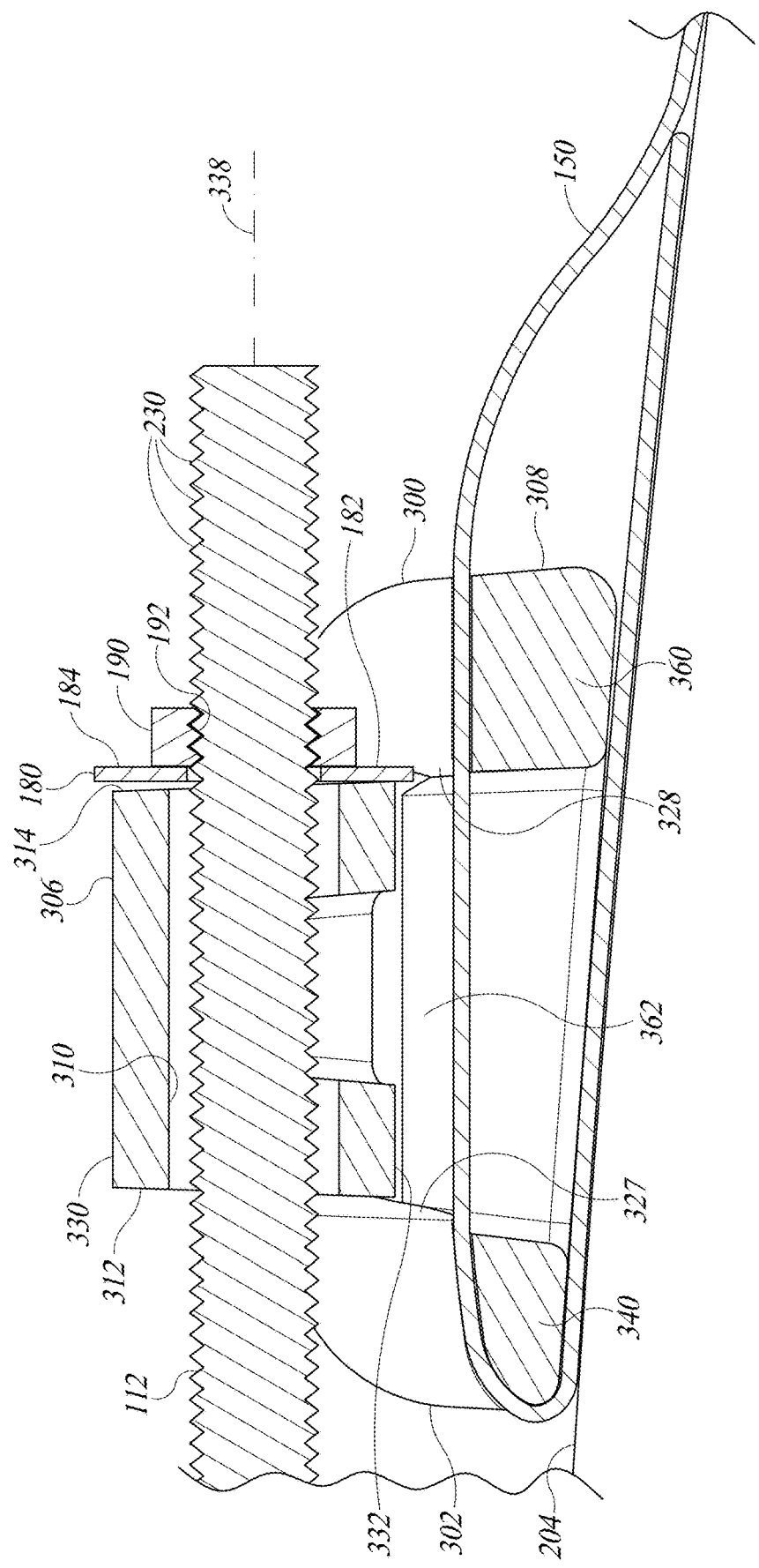
FIG. 15 is the cross-sectional view of FIG. 14 with the lug attached to the threaded rod and the band that is wrapped around the object(s).

The barrel 306 has an open-ended through-channel 310 that extends along the longitudinal dimension "L2." The through-channel 310 extends between an opening 316 (see FIG. 10) formed in the front facing surface 312 and an opening 318 formed in both the back facing surface 314. Referring to FIG. 14, in the embodiment illustrated, the through-channel 310 has a generally circular cross-sectional shape with an inner diameter "D3" (e.g., about 0.5 inches). In the embodiment illustrated, referring to FIG. 11, the barrel 306 is substantially cylindrically shaped with an outer diameter "D4" (e.g., about 0.84 inches). However, this is not a requirement. As shown in FIG. 15, the through-channel 310 is configured to allow the threaded rod 112 to pass therethrough.

Figure 10:
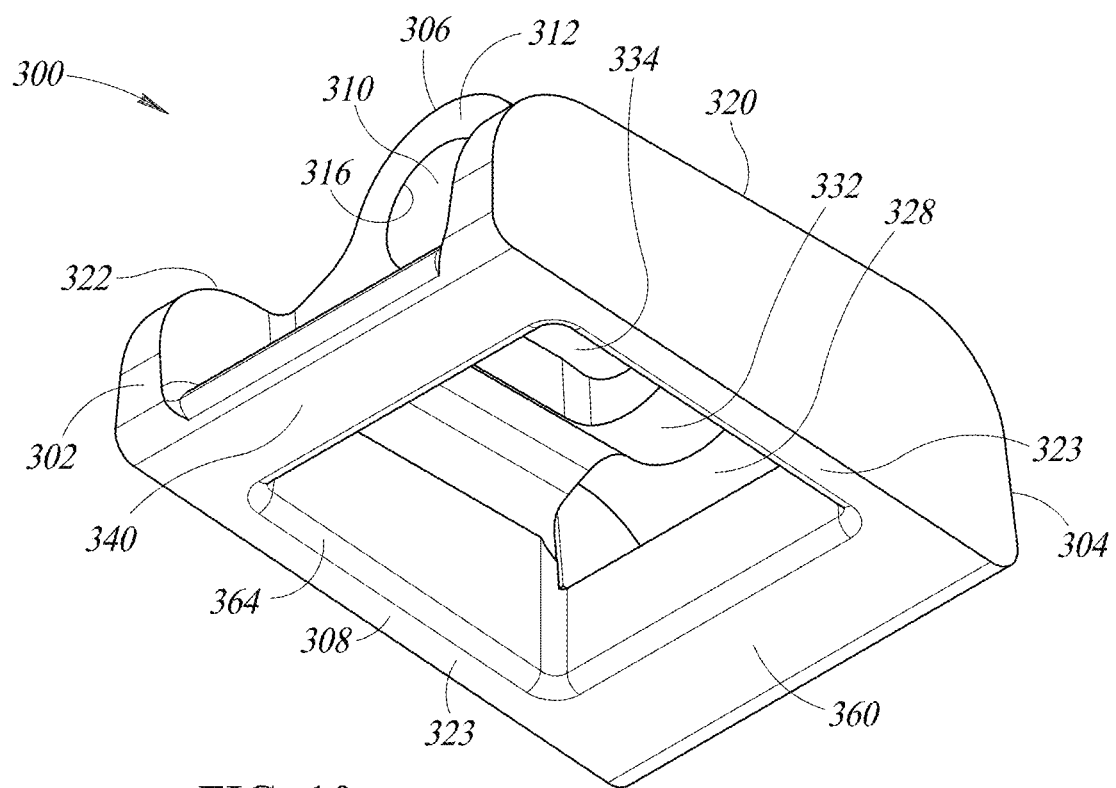
FIG. 10 is a bottom perspective view of a front portion of the lug of FIG. 9.

Referring to FIG. 9, the base portion 308 includes first and second side rails 320 and 322 that extend along the longitudinal dimension "L2." Referring to FIG. 10, the first and second side rails 320 and 322 may be substantially identical to one another and each have a lower edge 323. In the embodiment illustrated, the lower edges 323 of the first and second side rails 320 and 322 are each substantially planar. However, in alternate embodiments, the lower edges 323 may be curved (e.g., to correspond to the outer surface of the object(s) 204, illustrated in FIGS. 5, 7, 8, 15, and 16, against which the lower edges 323 of the lug 300 may be positioned).

Figure 13:
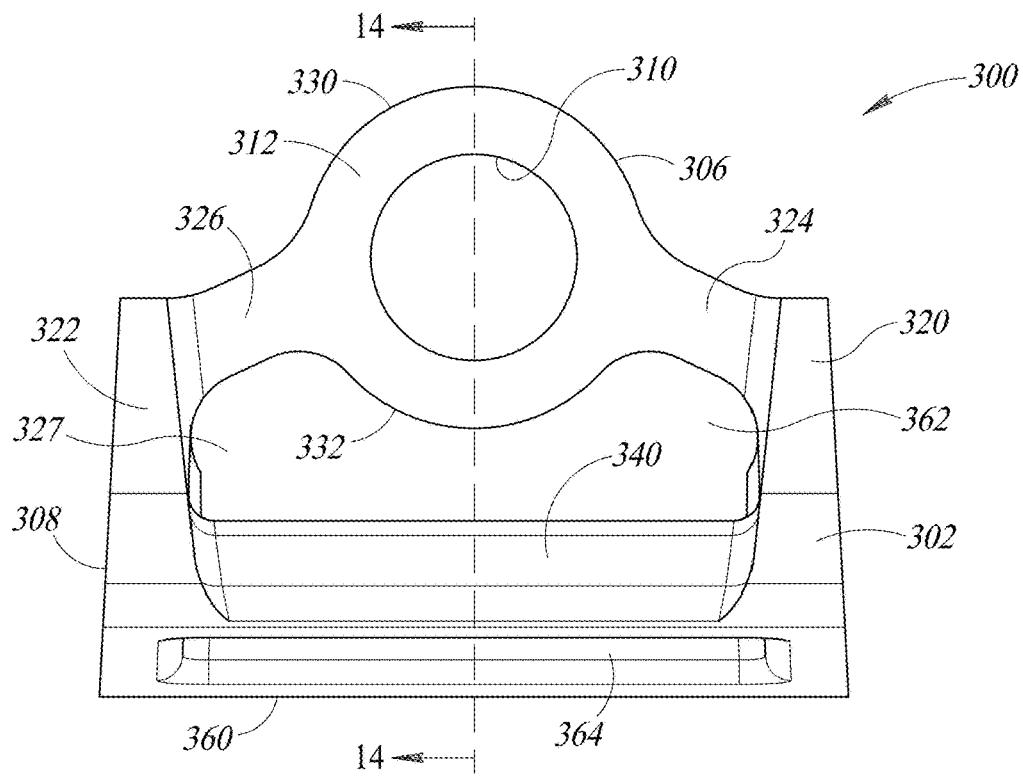
FIG. 13 is a front view of the lug of FIG. 9.

Referring to FIG. 9, a first angled support 324 is attached to the first side rail 320 and extends inwardly toward the barrel 306 and outwardly away from the first side rail 320. A second angled support 326 is attached to the second side rail 322 and extends inwardly toward the barrel 306 and outwardly away from the second side rail 322. The first and second angled supports 324 and 326 are aligned with one another along the longitudinal dimension "L2" and support the barrel 306 between the first and second side rails 320 and 322. The first and second angled supports 324 and 326 extend only partway toward the front portion 302 and only partway toward the back portion 304. Referring to FIG. 13, an open portion 327 is defined between the first and second side rails 320 and 322 and in front of the first and second angled supports 324 and 326. Similarly, referring to FIG. 11, an open portion 328 is defined between the first and second side rails 320 and 322 and behind the first and second angled supports 324 and 326. Thus, the barrel 306 is spaced apart from the base portion 308.

The first and second angled supports 324 and 326 position a distal portion 330 of the barrel 306 above the base portion 308 and a proximal portion 332 of the barrel 306 in between the first and second side rails 320 and 322. By way of a non-limiting example, referring to FIG. 14, the barrel 306 may have a length "B5" at the top of the distal portion 330 and along the longitudinal dimension "L2" (see FIG. 9). Referring to FIG. 10, the proximal portion 332 may include a transverse through-hole 334 that extends into the through-channel 310. For example, if investment casting is used to construct the lug 300, the transverse through-hole 334 may be included. However, inclusion of the transverse through-hole 334 is not a requirement. Referring to FIG. 14, the front and back facing surfaces 312 and 314 (see FIGS. 12, 14, and 15) may be angled such that the length "B5" of the top of the distal portion 330 (see FIGS. 11, 13, and 15) of the barrel 306 is shorter than a length "B6" (see FIG. 14) of the bottom of the proximal portion 332 of the barrel 306.

As mentioned above, it has been observed that increasing a distance between the front portion 302 and the back facing surface 314 decreases the vector tightening force applied to the front portion 302, which makes it less likely that the lug 300 will tip forwardly (and lift the back portion 304) when the threaded rod 112 is tightened. In the lug 300, this distance is approximately equal to a sum of the length "B6" and the amount by which the front facing surface 312 of the barrel 306 is spaced apart from the front portion 302 (e.g., about 0.5 inches). By way of a non-limiting example, the length "B6" may be about 1.37 inches. By way of another non-limiting example, the length "B5" may be greater than about 0.5 inches.

Referring to FIG. 10, in the front portion 302 and in front of the barrel 306, the first and second side rails 320 and 322 are connected together by a transverse front or head cross member 340. The head cross member 340 extends from the front portion 302 only partway toward the barrel 306 and only partway toward the first and second angled supports 324 and 326 (see FIGS. 9, 11, and 14). Thus, referring to FIG. 13, the open portion 327 extends between the head cross member 340 and the barrel 306 and between the head cross member 340 and the first and second angled supports 324 and 326. Referring to FIG. 15, the open portion 327 is configured to provide a passageway through which the band 150 may pass.

Referring to FIG. 9, in the back portion 304 and behind the barrel 306, the first and second side rails 320 and 322 are connected together by a transverse back or tail cross member 360. The tail cross member 360 extends from the back portion 304 only partway toward the barrel 306 and only partway toward the first and second angled supports 324 and 326. Thus, the open portion 328 extends between the tail cross member 360 and the barrel 306 and between the tail cross member 360 and the first and second angled supports 324 and 326. Referring to FIG. 15, the open portion 328 is configured to provide a passageway through which the band 150 may pass.

Referring to FIG. 13, the barrel 306 and the first and second angled supports 324 and 326 are positioned above the head and tail cross members 340 and 360. Thus, a through-channel or passageway 362 is positioned below the barrel 306 and the first and second angled supports 324 and 326 and above the head and tail cross members 340 and 360 in between the first and second side rails 320 and 322. Referring to FIG. 15, the passageway 362 extends through the open portions 327 and 328 and allows the band 150 to travel over both the head and tail cross members 340 and 360. The band 150 is wrapped partway around the head cross member 340 after traveling over the head cross member 340. Then, the band 150 travels under both the head and tail cross members 340 and 360 along the outer surface of the object(s) 204. Thus, as shown in FIG. 15, the head and tail cross members 340 and 360 both rest upon the band 150. As shown in FIG. 13, the proximal portion 332 of the barrel 306 is closer to the passageway 362 than the distal portion 330 of the barrel 306.

Referring to FIG. 10, in the embodiment illustrated, an opening 364 is defined by the first side rail 320, the second side rail 322, the head cross member 340, and the tail cross member 360. However, in alternate embodiments, the opening 364 may be omitted. In such embodiments, the head and tail cross members 340 and 360 may be implemented as a single member that extends from the front portion 302 to the back portion 304, has a head portion at the front portion 302, and has a tail portion at the back portion 304.

Figure 11:
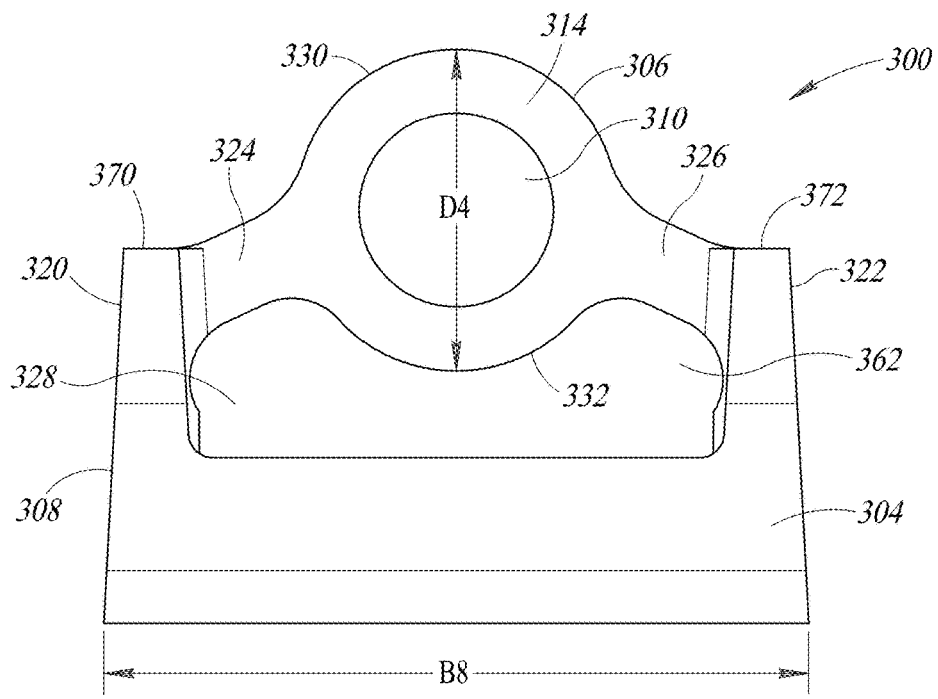
FIG. 11 is a back view of the lug of FIG. 9.
Figure 12:
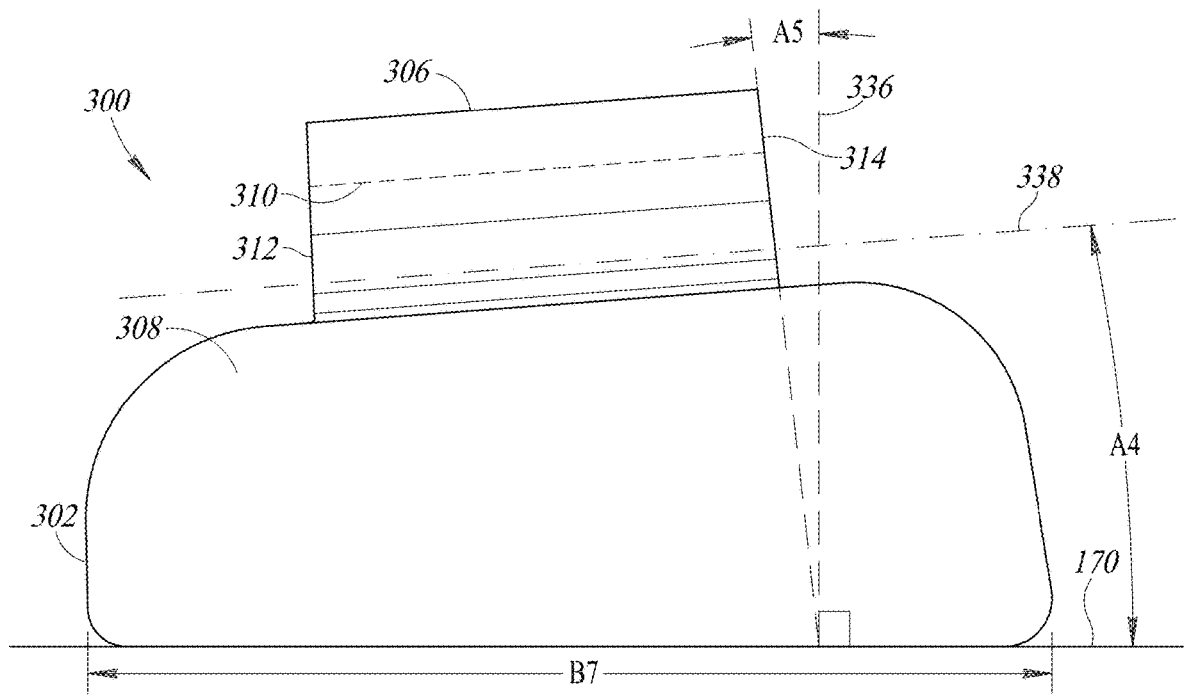
FIG. 12 is a side elevational view of the lug of FIG. 9 placed on the flat surface.

Referring to FIG. 12, when the base portion 308 of the lug 300 is positioned on the flat surface 170, the first and second angled supports 324 and 326 (see FIGS. 9, 11, and 14) position the through-channel 310 at an angle "A4" with respect to the flat surface 170. In FIG. 12, the through-channel 310 extends along a central axis represented by a dashed line 338. Thus, the through-channel 310 of the barrel 306 extends along the angle "A4" with respect to the flat surface 170. By way of a non-limiting example, the angle "A4" may range from about 3 degrees to about 6 degrees. For example, the angle "A4" may be a little greater than 4 degrees (e.g., about 4.29 degrees, about 4.35 degrees, and the like). By way of another non-limiting example, the angle "A4" may be within a range from 4 degrees to 5 degrees. By way of yet another non-limiting example, the angle "A4" (see FIG. 3) may range from 3 degrees to 9 degrees.

Referring to FIG. 14, an angle "A6" of other than zero degrees (e.g., a little greater than 4 degrees) is defined between the back facing surface 314 of the barrel 306 and a dashed line 366. The dashed line 366 intersects the back facing surface 314 and is perpendicular to the dashed line 338 (which represents the central axis of the through-channel 310). In other words, the back facing surface 314 may be other than perpendicular with respect to the dashed line 338. By way of a non-limiting example, the angle "A6" may range from about 3 degrees to about 6 degrees. For example, the angle "A6" may be a little greater than 4 degrees (e.g., about 4.29 degrees, about 4.35 degrees, and the like). By way of another non-limiting example, the angle "A6" may be within a range from 4 degrees to 5 degrees. By way of yet another non-limiting example, the angle "A6" (see FIG. 3) may range from 3 degrees to 9 degrees.

Referring to FIG. 15, the threaded rod 112 is operable to apply the vector tightening force to the lug 300. The washer 180 may be placed alongside the back facing surface 314 of the barrel 306. However, only the lower portion 182 of the washer 180 will abut the back facing surface 314 along the proximal portion 332 and the upper portion 184 of the washer 180 will be spaced apart from the back facing surface 314 of the barrel 306 along the distal portion 330. The nut 190 is threaded onto the threaded rod 112. The nut 190 is tightened against and applies the vector tightening force to the washer 180. The washer 180 applies the vector tightening force to the back facing surface 314 along the proximal portion 332 (or the lowest point possible), which pushes the front portion 302 of the lug 300 forwardly and outwardly away from the object(s) 204. This arrangement reduces the tendency of the front portion 302 of the lug 300 to tip toward the object(s) 204, which can bend the threaded rod 112 and/or cause the threaded rod 112 to bind as it moves. In other words, because the vector tightening force is directed at the back facing surface 314 along the proximal portion 332, the tipping aspect of the vector tightening force (created by tightening the nut 190) is reduced.

Therefore, the angle "A6" (see FIG. 14) causes the washer 180 to apply the vector tightening force directly to the back facing surface 314 along the proximal portion 332 (but not the distal portion 330) of the barrel 306, which pushes the front portion 302 of the lug 300 forwardly but not toward the object(s) 204 (see FIGS. 5, 7, 8, 15, and 16). This reduces the tendency of the front portion 302 of the lug 300 to tip toward the object(s) 204, which can bend the threaded rod 112 (see FIGS. 5, 7, 8, 15, and 16) and/or cause the threaded rod 112 to bind as the threaded rod 112 moves. In other words, because the vector tightening force is directed at the back facing surface 314 along the proximal portion 332 (but not the distal portion 330) of the barrel 306, the tipping aspect of the vector tightening force (created by tightening the nut 190) is reduced. In alternate embodiments, the lower portion 182 of the washer 180 may abut both the back facing surface 314 along the proximal portion 332 and at least a portion of the base portion 308. However, in such embodiments, the upper portion 184 of the washer 180 is spaced apart from the back facing surface 314 along the distal portion 330.

In FIG. 12, a dashed line 336 is perpendicular to the flat surface 170 and an angle "A5" is defined between the dashed line 336 and the back facing surface 314 of the barrel 306. The angle "A5" may be substantially identical to a sum of the angles "A4" and "A6."

Referring to FIG. 15, the washer 180 is placed alongside and abuts the proximal portion 332 of the barrel 306. However, the upper portion 184 of the washer will be spaced apart from the distal portion 330 of the barrel 306. The nut 190, which is threaded onto the threaded rod 112 and tightened against the washer 180, applies the vector tightening force to the washer 180. The washer 180 applies the vector tightening force to the proximal portion 332 of the barrel 306, which pushes the front portion 302 of the lug 300 forwardly and outwardly away from the object(s) 204. This arrangement reduces the tendency of the front portion 302 of the lug 300 to tip toward the object(s) 204, which can bend the threaded rod 112 and/or cause the threaded rod 112 to bind as it moves.

Referring to FIG. 9, the first and second side rails 320 and 322 may have angled upper surfaces 370 and 372, respectively. The first and second angled supports 324 and 326 are connected to the first and second side rails 320 and 322 at or near the angled upper surfaces 370 and 372, respectively. The first and second angled supports 324 and 326 may be oriented at the same angle as the angled upper surfaces 370 and 372, respectively.

Referring to FIG. 10, together the first side rail 320, the second side rail 322, the head cross member 340, and the tail cross member 360 define a generally rectangular outer shape having a length "B7" (see FIG. 12) and a width "B8" (see FIG. 11). By way of non-limiting examples, the length "B7" may be about 2.48 inches and the width "B8" may be about 1.82 inches. The first and second side rails 320 and 322 may each have a height of about 0.97 inches.

Referring to FIG. 15, the band 150 passes over the tail cross member 360 and exerts pressure on the back portion 304 of the lug 300 when the nut 190 is tightened against the washer 180. That pressure either prevents the back portion 304 of the lug 300 from rising, which tilts the lug 300 forwardly toward the object(s) 204, or reduces an amount by which the back portion 304 of the lug 300 will rise and tilt the lug 300 forwardly toward the object(s) 204. The greater the length "B7" (see FIG. 12) of the lug 300, the greater the lever force of the band 150 pressing down on the tail cross member 360, which reduces tilting. Therefore, the length "B7" (see FIG. 12) and/or the position of the tail cross member 360 may be determined at least in part based on whether the lug 300 tilts toward the object(s) 204.

Further, as mentioned above, increasing the distance between the front portion 302 and the back facing surface 314 of the barrel 306 decreases the vector tightening force applied to the front portion 302 by the threaded rod 112, which makes it less likely that the lug 300 will tip forwardly (causing the back portion 304 to lift in the direction of the threaded rod 112) when the threaded rod 112 is tightened. Referring to FIG. 14, in the lug 300, the distance between the front portion 302 and the back facing surface 314 is equal to a sum of the length "B6" and the distance between the front portion 302 and the front facing surface 312 (e.g., about 0.5 inches). Thus, by increasing the length "B6" or the distance between the front portion 302 and the front facing surface 312, it may be possible to reduce the likelihood that the lug 300 will tip forwardly. Therefore, the length "B6" or the distance between the front portion 302 and the front facing surface 312 may be determined at least in part based on whether the lug 300 tilts toward the object(s) 204.

FIG. 16 illustrates an embodiment of a band clamp 400 clamping the band 150 into the closed shape 202 (see FIG. 6) around the object(s) 204 (e.g., the staves 260 of the hot tub). The band clamp 400 includes a first lug 300A, a second lug 300B, the threaded rod 112, and the fasteners 210. In the embodiment illustrated, the fasteners 210 have been implemented as the nuts 212 and 214 and the washers 216 and 218. The first and second lugs 300A and 300B are each substantially identical to the lug 300 (see FIGS. 9-15). Therefore, in the drawings, like reference numerals have been used to identify like components of the lugs 300, 300A, and 300B.

The band 150 is formed into the closed shape 202 (see FIG. 6) by connecting the first and second ends 220 and 222 of the band 150 to the first and second lugs 300A and 300B, respectively. Then, the first and second lugs 300A and 300B are coupled together by the threaded rod 112 and the fasteners 210.

The first end 220 of the band 150 is connected to the first lug 300A by passing the first end 220 through the passageway 362 (see FIGS. 11, 13, and 15) of the first lug 300A, which extends over the head and tail cross members 340 and 360 of the first lug 300A. Then, the band 150 is bent around the head cross member 340 (see FIGS. 10 and 13-15) and directed backwardly under the tail cross member 360 of the first lug 300A. As shown in FIG. 16, the first end 220 may be positioned behind the first lug 300A. Similarly, the second end 222 of the band 150 is connected to the second lug 300B by passing the second end 222 through the passageway 362 (see FIGS. 11, 13, and 15) of the second lug 300B, which extends over the head and tail cross members 340 and 360 of the second lug 300B. Then, the band 150 is bent around the head cross member 340 (see FIGS. 10 and 13-15) and directed backwardly under the tail cross member 360 of the second lug 300B. As shown in FIG. 16, the second end 222 may be positioned behind the second lug 300B. Thus, the first and second lugs 300A and 300B do not have to be welded to the band 150 to form the closed shape 202 (see FIG. 6).

As mentioned above, the first and second lugs 300A and 300B are coupled together by the threaded rod 112 and the fasteners 210. The first and second lugs 300A and 300B are positioned so that their front portions 302 (see FIGS. 9, 10, and 12-15) are aligned with one another and the threaded rod 112 is inserted into the barrels 306 of the first and second lugs 300A and 300B. The first end 240 extends outwardly from the barrel 306 of the first lug 300A and the second end 242 extends outwardly from the barrel 306 of the second lug 300B.

The fasteners 210 couple the first end 240 to the first lug 300A. First, the washer 216 is positioned on the first end 240 of the threaded rod 112. The washer 216 is slid along the threaded rod 112 until the washer 216 abuts the back facing surface 314 (see FIGS. 9, 11, 12, 14, and 15) along the proximal portion 332 (but not the distal portion 330) of the barrel 306 of the first lug 300A. Next, the nut 212 is positioned on the first end 240 of the threaded rod 112 and threaded along the threaded rod 112 until the nut 212 is positioned alongside the washer 216. Finally, referring to FIG. 8, the nut 212 (see FIGS. 7 and 16) is tightened as desired (e.g., using a wrench 250).

Likewise, referring to FIG. 16, the fasteners 210 couple the second end 242 to the second lug 300B. First, the washer 218 is positioned on the second end 242 of the threaded rod 112. The washer 218 is slid along the threaded rod 112 until the washer 218 abuts the back facing surface 314 along the proximal portion 332 (but not the distal portion 330) of the barrel 306 of the second lug 300B. Next, the nut 214 is positioned on the second end 242 and threaded along the threaded rod 112 until the nut 214 is positioned alongside the washer 218. Finally, referring to FIG. 8, the nut 214 (see FIGS. 7 and 16) is tightened as desired (e.g., using a wrench 252).

Referring to FIG. 16, tightening one or both of the nuts 212 and 214 decreases the distance between the first and second lugs 300A and 100B and decreases the area of the closed shape 202 (see FIG. 6). Loosening one or both of the nuts 212 and 214 increases the distance between the first and second lugs 300A and 300B and increases the area of the closed shape 202 (see FIG. 6). Thus, tightening one or both of the nuts 212 and 214 increases tension in the band 150 when the band 150 is used to clamp the object(s) 204. On the other hand, loosening one or both of the nuts 212 and 214 decreases the tension in the band 150 when the band 150 is used to clamp the object(s) 204.

As mentioned above, because of the angle "A6" (see FIG. 14), the washer 216 abuts the back facing surface 314 (see FIGS. 9, 11, 12, 14, and 15) along the proximal portion 332 (but not the distal portion 330) of the barrel 306 of the first lug 300A. Similarly, because of the angle "A6" (see FIG. 14), the washer 218 abuts the back facing surface 314 (see FIGS. 9, 11, 12, 14, and 15) along the proximal portion 332 (but not the distal portion 330) of the barrel 306 of the second lug 300B. Thus, the forwardly directed vector tightening forces applied to the first and second lugs 300A and 300B by the tightening the nuts 212 and 214, respectively, pushes the front portions 302 of the first and second lugs 300A and 300B forwardly but not toward the object(s) 204. This reduces the tendency of the first and second lugs 300A and 300B to tip toward the object(s) 204, which can bend the threaded rod 112 and/or bind the threaded rod 112 as the threaded rod 112 moves.

Like the band clamp 200 (see FIGS. 6-8), the band clamp 400 is configured to help prevent the threaded rod 112 from bending when one or both of the nuts 212 and 214 is tightened. This achieved because the first and second lugs 300A and 300B are configured to avoid tipping forwardly (and toward the object(s) 204) when one or both of the nuts 212 and 214 are tightened, which can cause the threaded rod 112 to bend. This allows the first and second lugs 300A and 300B to move smoothly together when one or both of the nuts 212 and 214 are tightened without the first and second lugs 300A and 300B tipping or the threaded rod 112 binding.

The tail cross member 360 is configured to maintain tight contact with the band 150 underneath the tail cross member 360. This maintains pressure on any material (e.g., the object(s) 204) positioned inside and clamped by the closed shape 202 (see FIG. 6) defined by the band 150. For example, the object(s) 204 may be the staves 260 of a hot tub and the closed shape 202 (see FIG. 6) may be used to clamp the staves 260 together to form the hot tub. The band 150 may be used to maintain even pressure on each of the staves 260.

Referring to FIG. 16, the outside threads 230 of the threaded rod 112 have been illustrated as extending the full length of the threaded rod 112 from the first end 240 to the second end 242. However, in alternate embodiments, the threaded rod 112 may be implemented as a carriage bolt (e.g., a galvanized carriage bolt) having a bolt head at one of the first and second ends 240 and 242. Immediately adjacent to the bolt head, the carriage bolt has a bolt section with a generally square cross-sectional shape that functions as a key. In such embodiments, one of the nuts 212 and 214 and one of the washers 216 and 218 may each be omitted. Further, the through-channel 310 (see FIGS. 9-15) of one or both of the first and second lugs 300A and 300B may have a square cross-sectional shape that extends from the back facing surface 314 (see FIGS. 9, 11, 12, 14, and 15) toward the front facing surface 312 (see FIGS. 10 and 12-15) and functions as a keyway. The keyway is configured to receive and prevent the rotation of the key of the carriage bolt with respect to the barrel 306.

Referring to FIG. 16, some or all of the components of the band clamp 400 may be packaged into a second kit. For example, the second kit may include the first and second lugs 300A and 300B. Optionally, the second kit may also include the threaded rod 112, the band 150, and/or the fasteners 210 (e.g., the nuts 212 and 214 and the washers 216 and 218).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A lug for use with a threaded rod and a band, the threaded rod being operable to apply a tightening force to the lug, the lug comprising:
   a rod receiving portion having a distal portion, a proximal portion, and an open-ended through-channel, the distal portion being opposite the proximal portion, the open-ended through-channel being configured to allow the threaded rod to pass therethrough; and
   a band receiving portion connected to the rod receiving portion, the band receiving portion having a head portion and a tail portion, the band receiving portion comprising a passageway that extends in between the rod receiving portion and the head and tail portions, the passageway allowing the band to travel over both the head and tail portions, the band receiving portion being configured to allow the band to travel over the tail portion, through the passageway, and over the head portion, the band receiving portion being configured to allow the band to wrap partway around the head portion after traveling through the passageway, and thereafter to travel under both the head and tail portions, the proximal portion of the rod receiving portion being closer to the passageway than the distal portion of the rod receiving portion, the threaded rod applying the tightening force directly to at least one of the band receiving portion and the proximal portion of the rod receiving portion, the threaded rod not applying the tightening force directly to the distal portion of the rod receiving portion.

2. The lug of claim 1, wherein the rod receiving portion is positioned closer to the head portion than the tail portion.

3. The lug of claim 1, further comprising:
a front portion whereat the head portion is positioned; and
a back portion opposite the front portion, the tail portion being positioned at the back portion, when the band is tightened, the band being pulled down against the tail portion thereby either (a) preventing the back portion of the lug from rising and tilting the lug forwardly, or (b) reducing an amount by which the back portion of the lug will rise and tilt the lug forwardly.

4. The lug of claim 1, wherein the band receiving portion positions the open-ended through-channel to extend at an angle with respect to a flat surface when the band receiving portion is positioned upon the flat surface.

5. The lug of claim 4, wherein the angle is 3 degrees to 9 degrees.

6. The lug of claim 1, wherein the band receiving portion comprises first and second side rails extending along a longitudinal dimension,
the head portion extends transversely between the first and second side rails, and
the tail portion extends transversely between the first and second side rails.

7. The lug of claim 6, wherein the band receiving portion comprises a platform that extends transversely between the first and second side rails, and
the proximal portion of the rod receiving portion is attached to the platform.

8. The lug of claim 7 being for use with a washer and a nut, wherein the platform extends toward the tail portion farther than the rod receiving portion,
the tightening force is created by threading the nut onto the threaded rod when the threaded rod is received inside the open-ended through-channel,
the washer is positioned on the threaded rod between the nut and the rod receiving portion when the threaded rod is received inside the open-ended through-channel,
the washer contracts a tail facing surface of the platform but not the rod receiving portion when the threaded rod is received inside the open-ended through-channel, and
the washer applies the tightening force directly to the tail facing surface but not to the rod receiving portion.

9. The lug of claim 6, wherein the band receiving portion comprises a first support connected to both the rod receiving portion and the first side rail,
the band receiving portion comprises a second support connected to both the rod receiving portion and the second side rail, and
the first and second supports position the open-ended through-channel to extend at an angle with respect to a flat surface when the band receiving portion is position upon the flat surface.

10. The lug of claim 6, wherein the tail portion extends outwardly beyond the first and second side rails, and
the tail portion positions the first and second side rails at an angle with respect to a flat surface when the band receiving portion is positioned upon the flat surface.

11. The lug of claim 6, wherein the rod receiving portion is spaced apart from both the head portion and the tail portion along the longitudinal dimension.

12. The lug of claim 6, wherein the rod receiving portion is spaced apart from the tail portion along the longitudinal dimension, and
the rod receiving portion is directly adjacent the head portion along the longitudinal dimension.

13. A lug for use with a threaded rod and a band, the lug comprising:
a front portion;
a back portion opposite the front portion;
a rod receiving portion having an open-ended through-channel configured to allow the threaded rod to pass therethrough;
a band receiving portion connected to the rod receiving portion, the band receiving portion having a head portion positioned in the front portion and a tail portion positioned in the back portion, the band receiving portion positioning the open-ended through-channel to extend at an angle with respect to a flat surface when the band receiving portion is positioned upon the flat surface; and
a passageway that extends in between the rod receiving portion and the band receiving portion, the passageway allowing the band to travel therethrough from the back portion to the front portion, the band receiving portion allowing the band to wrap partway around the head portion after traveling through the passageway and thereafter to travel under the band receiving portion past the tail portion.

14. The lug of claim 13, wherein the angle is 3 degrees to 9 degrees.

* * * * *